UNITED STATES PATENT OFFICE.

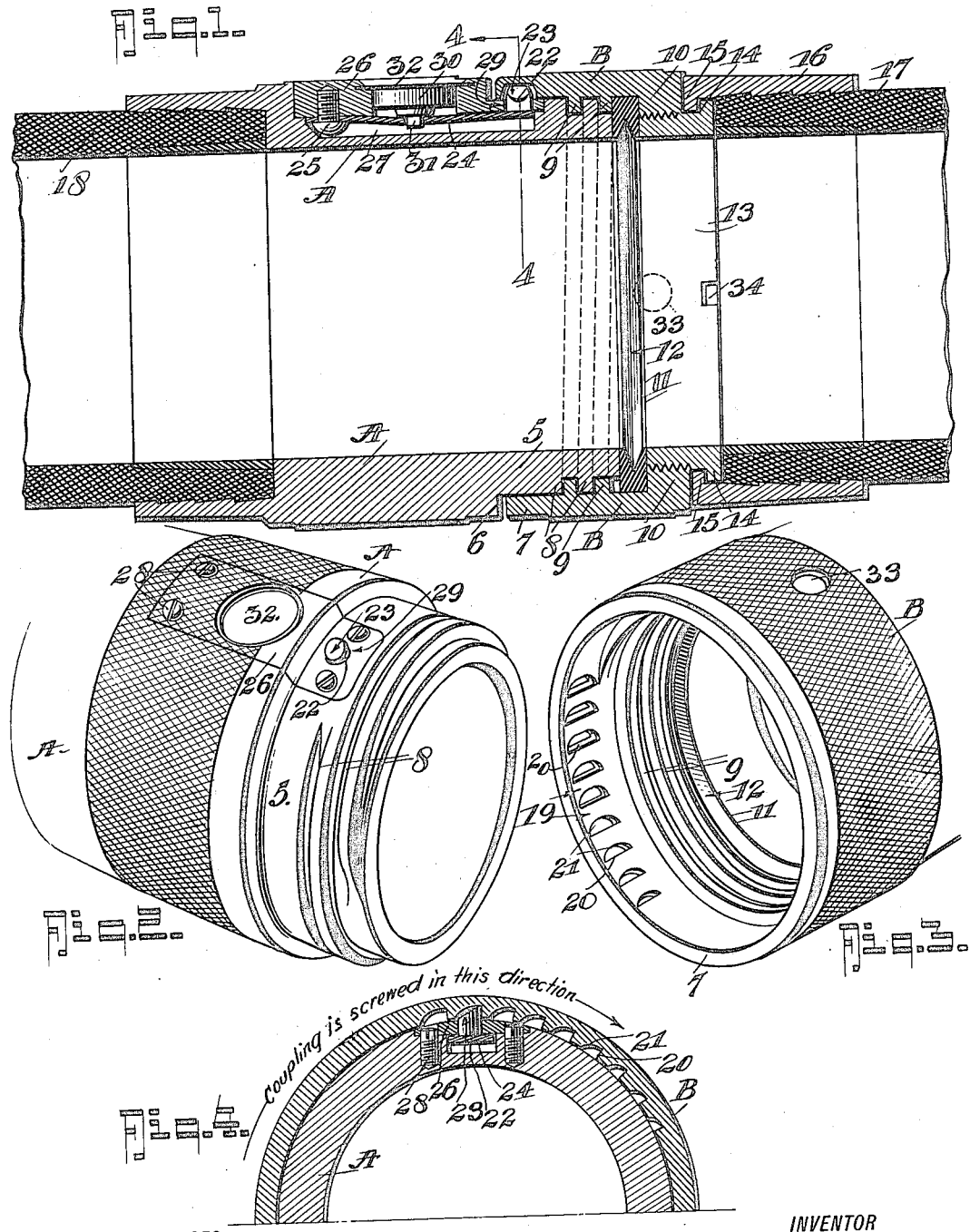

ALBERT GEORGE HUGHES, OF DOUGLAS, ARIZONA.

HOSE-COUPLING.

1,213,492.　　　　　Specification of Letters Patent.　　Patented Jan. 23, 1917.

Application filed November 1, 1915. Serial No. 59,068.

*To all whom it may concern:*

Be it known that I, ALBERT GEORGE HUGHES, a citizen of the United States, and a resident of Douglas, in the county of Cochise and State of Arizona, have invented a certain new and useful Improvement in Hose-Couplings, of which the following is a specification.

One of the principal objects of my invention is to provide an improved hose coupler capable of being readily and quickly coupled and uncoupled without the use of tools, and embodying an improved means of locking the coupler in coupled position.

A further object of the invention is to provide an improved hose coupler of the class described, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a view in section taken centrally and longitudinally through a pipe coupling, constructed according to my invention, showing the same as in coupled position. Fig. 2 represents a view in perspective of the male member of the device. Fig. 3 represents a view in perspective of the female member of the device. Fig. 4 represents a view in section taken vertically and transversely on the plane indicated by the line 4—4 of Fig. 1, looking in the direction indicated by the arrow.

The invention contemplates a coupler consisting essentially of a male member and a female member adapted to be threaded one onto the other, one member being provided with a spring actuated detent adapted to coact with an annular series of teeth in the other member, for holding the members in coupled position.

Referring now particularly to the drawings, at A is indicated the male member of the device in general, and at B is indicated the female member. The former at its inner end is reduced as at 5, to form a shoulder 6 against which the inner end 7 of the female member may be brought into engagement when the device is in coupled position. The reduced portion 5 of the male member is provided from its outer end a distance inwardly, with screw threads 8, and the female member B is provided at a distance inwardly from its inner end and interiorly, with threads 9 adapted to engage with the threads 8 when the members are turned one onto the other in the position indicated in Fig. 1. The member B is provided at a distance spaced from the innermost threads 9, with an inwardly extending threaded flange 10. Between this flange 10 and the innermost thread 9, is, a channel in which an annular compressible washer 11 is disposed. When the device is in coupled position, the inner end of the male member A engages against washer 11 as clearly indicated in Fig. 1. This washer or gasket is provided with a V-shaped channel 12 extending entirely around the inner surface thereof, the purpose whereof is to render the inner portions of the washer particularly flexible, whereby the pressure of the fluid flowing through the coupler may act upon the inner portions of the washer and thus expand them into engagement with the adjacent portions of the device, whereby to provide an exceedingly efficient waterproof joint.

An interiorly threaded ring 13 is turned into the flange 10 to abut against the washer 11. This ring is provided at its outer end with an outstanding flange 14 between which and the outer end of member B is engaged an inwardly extending flange 15 provided on an annular hose terminal 16. A hose indicated at 17 is secured in this terminal in any desired manner.

The outer end of member A is reamed out to receive a hose end 18 which may be secured therein in any desired manner. If desired the outer end of member A may be threaded whereby the member may be screwed onto a fire plug.

Adjacent its inner end the member B is provided with an annular series of depressions 19 cut into the inner surface of said member. These depressions are substantially semi-circular in formation, providing squared shoulders 20 and concaved floors 21 bearing away therefrom. The depressions are adapted to coact with a spring-actuated detent or dog 22 carried by the male member A. This detent has a beveled upper end 23, which may ride over the shoulders 21 when the device is being coupled, but which will engage the shoulders to prevent reverse movement of the members until the arm 24 on which the detent is carried, is depressed. This arm is in the nature of a spring connected at its inner end by a screw or other suitable means 25 to the under face of a plate 26. This plate is adapted to fit in a recess 27 cut in the outer wall of member A longitudinally thereof, and may be retained in place by means of screws 28. The plate preserves the contour and form of the member A and at its outer surface lies flush with the outer surface of said member. The detent 22 extends through an opening 29 provided in the reduced portion 5 of the male member, defined by the outer end of plate 26.

The plate is provided with a bore in which a circular button 30 is disposed, said button having a depending pin 31 extending through an opening in the spring arm 24. The normal tendency of this arm is to maintain the detent in outward position, and the button in raised position. Above this button is arranged a thin, flexible, preferably metallic plate 32 which guards the button and which prevents the entrance of dust and other foreign matter into the recess 27. By depressing the flexible plate 32, the button 30 will be pushed downwardly, whereby to disengage the detent 22 from engagement with the depressions 19 whereby the device may be uncoupled. The female member B together with ring 13 may turn relatively to the hose terminal 16, and thus act as a swivel member whereby the device may be quickly and readily coupled and uncoupled by hand.

The member B is provided externally and at diametrically opposed points, with recesses 33 for the reception of a spanner wrench, whereby the member may be turned onto a street hydrant, and the ring 13 is provided internally with diametrically opposed recesses 34 for the reception of a spanner wrench, whereby this ring may be detached from the member B when necessary.

Although I have described the preferred embodiment of my invention, I may desire to make such changes in the construction, combination, and arrangement of parts thereof, as do not depart from the spirit of the invention, and the scope of the appended claims.

The depressions 19, it will be noted, are graduated in width to conform with the pitch of the threads, so that as the members move one longitudinally of the other in being coupled, the pawl will continually aline with the depressions.

I claim:—

1. A coupler comprising a male member and a female member respectively externally and internally threaded whereby to be turned into engagement one with the other, a recess in one of the members, a plate having two openings therethrough arranged to cover the recess and having its outer surface flush with the outer surface of said member to preserve the contour of the latter, a spring arm arranged in the recess and secured at one end to the plate, a detent carried at the other end of the arm and extending through one of the openings in said plate at a point adjacent to and inwardly of the threaded portion of the male member, a series of depressions provided interiorly of the female member circumferentially thereof and outwardly of the threaded portion of the female member and adapted to coact with said detent in maintaining the members in coupled position, a button slidably arranged in the other opening in the plate above the spring arm and having a pin engaging said arm, and a flexible plate arranged in the opening above the button.

2. A coupler comprising a male member and a female member respectively externally and internally threaded whereby to be turned into engagement one with the other, a recess in one of the members, a plate having two openings therethrough arranged to cover the recess and having its outer surface flush with the outer surface of said member to preserve the contour of the latter, a spring arm arranged in the recess and secured at one end to the plate, a detent carried at the other end of the arm and extending through one of the openings provided in said plate, a series of depressions provided interiorly of the female member circumferentially thereof and gradually increasing in width to conform with the pitch of the threads, said depressions adapted to coact with said detent in maintaining the members in coupled position, a button slidably arranged in the other opening in the plate above the spring arm and connected with said spring arm, and a flexible plate arranged in the opening above the button.

3. A coupler comprising a male member and a female member respectively externally and internally threaded whereby to be turned into engagement one with the other, a recess in one of the members, a perforated plate arranged to cover the recess, a spring-actuated detent carried on the underside of the plate whereby to be housed in the recess, said detent having a portion extending outwardly through the opening in the plate, a series of depressions formed circumferentially of the other member and adapted to coact with the detent in maintaining the members in coupled position, and means carried by the plate for operating the detent manually whereby to disengage it from the depressions.

ALBERT GEORGE HUGHES.

Witness:
  EARL A. HEMPHILL.